(12) United States Patent
Yamato et al.

(10) Patent No.: US 7,425,372 B2
(45) Date of Patent: Sep. 16, 2008

(54) COATING AGENT COMPOSITION

(75) Inventors: Toshio Yamato, Tokyo (JP); Hiroyoshi Shimotsu, Tokyo (JP)

(73) Assignee: GE Toshiba Silicones Co., Ltd., Tokyo (JP)

( * ) Notice: Subject to any disclaimer, the term of this patent is extended or adjusted under 35 U.S.C. 154(b) by 276 days.

(21) Appl. No.: 10/560,343

(22) PCT Filed: Jun. 4, 2004

(86) PCT No.: PCT/JP2004/007821

§ 371 (c)(1),
(2), (4) Date: Dec. 12, 2005

(87) PCT Pub. No.: WO2004/111144

PCT Pub. Date: Dec. 23, 2004

(65) Prior Publication Data

US 2006/0167175 A1    Jul. 27, 2006

(30) Foreign Application Priority Data

Jun. 13, 2003   (JP)   ............... 2003-169102

(51) Int. Cl.
*C08L 83/04* (2006.01)

(52) U.S. Cl. .............. 428/447; 428/515; 428/519; 428/522; 525/100; 525/101; 525/104; 525/477; 525/478

(58) Field of Classification Search .............. None
See application file for complete search history.

(56) References Cited

U.S. PATENT DOCUMENTS

| 5,527,841 | A | * | 6/1996 | Inokuchi et al. | ............. 523/435 |
| 6,057,042 | A |   | 5/2000 | Shimotsu |   |
| 2006/0222870 | A1 | * | 10/2006 | Inokuchi | .............. 428/447 |

FOREIGN PATENT DOCUMENTS

| JP | 6-025604 A | 2/1994 |
| JP | 9-165548 A | 6/1997 |
| JP | 11-043647 A | 2/1999 |
| JP | 2001-207106 A | 7/2001 |
| JP | 2002-188057 A | 7/2002 |
| JP | 2004-010571 A | 1/2004 |

* cited by examiner

*Primary Examiner*—Marc S Zimmer
(74) *Attorney, Agent, or Firm*—Foley & Lardner LLP

(57) ABSTRACT

The coating agent composition comprises an emulsion containing (A) polydiorganosiloxane having a viscosity of 50 to 10,000,000 mPa·s at 25° C. and having both terminal ends blocked by hydroxyl groups, (B) polyorganohydrogensiloxane having at least three hydrogen atoms bonded to silicon atoms in one molecule, (C) a curing catalyst, and (D) chlorinated polyolefine and/or acryl-modified polyolefine, with which (E) fine spherical particles comprised of a rubber-like elastomer having hardness of less than 90 are mixed to disperse into it. The coating agent composition having good uniform applying property, non tackness, water repellency and lubricating properties and outstanding adhesiveness to a rubber or plastic substrate can be obtained.

5 Claims, 1 Drawing Sheet

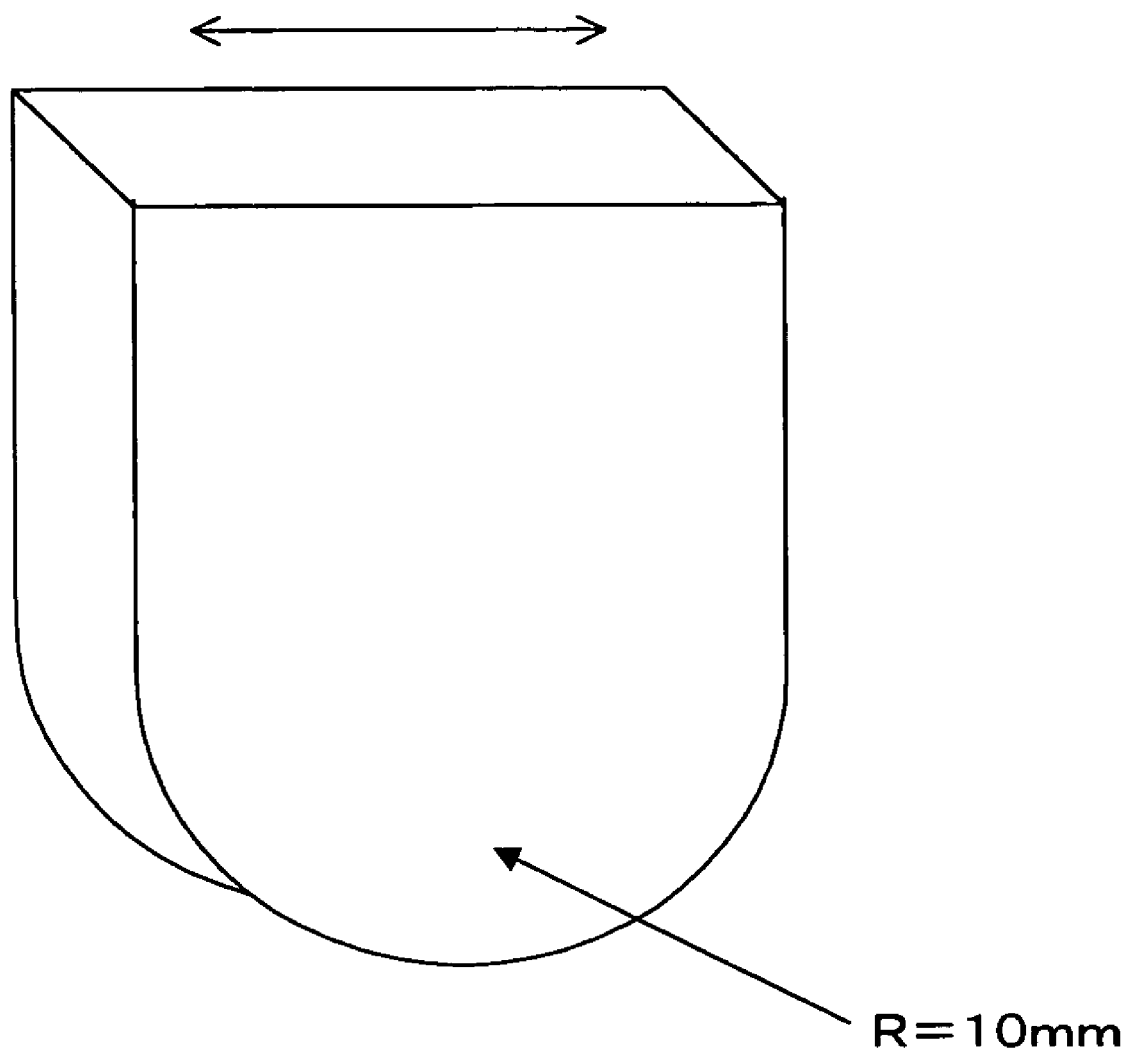

COATING AGENT COMPOSITION

TECHNICAL FIELD

The present invention relates to a coating agent composition, and more particularly to a coating agent composition which can be coated on the surface of a substrate of rubber, plastic or the like to form a coating film having non tackness, water repellency and lubricating properties and also excelling in adhesiveness and abrasion resistance.

BACKGROUND ART

Conventionally, ethylene-propylene-diene ternary copolymer (EPDM) rubber and various types of rubber products used as automobile weather-strips are coated with a coating agent comprised of a polyorganosiloxane composition to provide their surfaces with non tackness, water repellency, abrasion resistance and lubricating properties.

Such a coating agent is known to be, for example, a composition which contains polydiorganosiloxane having hydroxyl groups at the terminal ends and polyorganosiloxane having hydrogen atoms bonded to silicon atoms and/or organoalkoxysilane and a curing catalyst.

But, such a coating agent composition generally contains an organic solvent and has safety and hygienic problems, handling problems resulting from flammability, and a problem of a large averse effect on natural environments. Therefore, a water-based emulsion type coating agent not containing an organic solvent is under development in these years.

But, if a coating agent of a type diluted with an organic solvent is directly applied to a water-based type, a coating film cannot be provided with satisfactory durability and adhesiveness (adhesion). And, there is also a problem that it is hard to provide a water-based type because a silane component reacts with water.

Meanwhile, as an emulsion type silicone (polyorganosiloxane) based coating agent, a composition containing various types of siloxane compounds is proposed (e.g., Patent Document 1).

But, this coating agent does not provide satisfactory adhesiveness and abrasion resistance of the coating film, and particularly does not provide a non foamed rubber material or a substantially non foamed rubber material with the coating film having satisfactory adhesiveness and film strength. There are also problems that the storage stability of the emulsion and the usable life after blending individual components are not satisfactory.

To improve the adhesiveness and abrasion resistance of the coating film, there is proposed a coating agent including a dealcoholic condensation type silicone-based emulsion mixed with chlorinated polyolefine having a maleic anhydride group (e.g., Patent Document 2).

In the coating agent described in Patent Document 2, however, the main component silicone is a dealcoholic condensation type silicone, and the adhesiveness and abrasion resistance of the coating film are not satisfactory.

Besides, there is also proposed a coating agent, which is a dehydrogenation condensation type silicone emulsion mixed with a particular adhesion improving component (such as an amino silane compound, an epoxy silane compound or carboxylic acid) (e.g., Patent Document 3).

But, the above coating agent is not satisfactory in terms of a uniform applying property, non tackness, water repellency, lubricating properties and adhesiveness with the substrate and demanded for further improvement.

Besides, a dealcoholic condensation type coating agent, which contains organotrialkoxysilane as a crosslinking component, and an amide group, a carboxyl group-containing organotrialkoxysilane and epoxy group containing trialkoxysilane as adhesiveness improving components, is proposed in these years (e.g., Patent Document 4).

But, this coating agent is also not satisfactory in the adhesiveness and abrasion resistance of the coating film, and a mixing method and a usable life after mixing have problems because silane having a hydrolysis property in the presence of a catalyst is mixed.

Furthermore, the coating agent is demanded in these years that, when a coated mold part in a wet state is rubbed against glass or the like, frictional sound, so-called creaking sound, is not produced or the coated surface is not damaged because of rubbing with the coated metal surface.

Patent Document 1: JP-A HEI 8-245882
Patent Document 2: JP-A 2001-207106
Patent Document 3: JP-A 2002-188057
Patent Document 4: JP-A 2003-155411

SUMMARY OF THE INVENTION

The present invention provides a coating agent, which has good storage stability, uniform applying property, non tackness, water repellency, usable life and lubricating properties, and particularly improved adhesiveness and abrasion resistance to a substrate, as a treating agent for the surface of the substrate, for example, as a water-based coating agent for a sheet of EPDM or the like and a molded product.

The invention also provides a water-based coating agent which is improved in its adverse effect on a coated metal surface being emphasized in these years and does not produce creaking sound even if rubbed against glass in a water-wet state.

The present inventors have made a devoted study in order to achieve the above-described objects and completed the present invention by finding that a water-based coating agent having outstanding properties can be obtained by mixing fine spherical particles having rubber-like elasticity with an emulsion containing a particular silicone polymer and chlorinated polyolefine and/or acryl-modified polyolefine.

The coating agent composition of the present invention includes an emulsion containing (A) polydiorganosiloxane having a viscosity of 50 to 10,000,000 mPa·s at 25° C. and having both terminal ends blocked by hydroxyl groups, (B) polyorganohydrogensiloxane having at least three hydrogen atoms bonded to silicon atoms in one molecule, (C) a curing catalyst and (D) chlorinated polyolefine and/or acryl-modified polyolefine, with which (E) fine spherical particles comprised of a rubber-like elastomer having hardness of less than 90 are mixed to disperse into it.

In the coating agent composition, the component (E) can be fine spherical particles comprised of a rubber-like elastic material having hardness of 60 to 80. A total content of the chlorinated polyolefine and the acryl-modified polyolefine of the component (D) can be 5 to 150 parts by weight to 100 parts by weight of the polydiorganosiloxane of the component (A). And, the content of the fine spherical particles of the rubber-like elastic material of the component (E) can be 10 to 150 parts by weight to 100 parts by weight of the polydiorganosiloxane of the component (A). And, alkylamine oxide and/or water-insoluble amino group-containing polyorganosiloxane can also be contained.

Besides, this coating agent composition can be coated on a mold part which is formed of an foamed or non foamed EPDM.

According to the coating agent composition of the present invention, a coating film having quite outstanding adhesiveness and good lubricating properties, non tackness and water repellency can be formed on the substrate formed of rubber or plastic, and particularly on the substrate formed of foamed or non foamed EPDM rubber. This coating film also has a low coefficient of friction and outstanding abrasion resistance.

Therefore, the coating agent composition of the present invention can be used suitably as a surface treatment agent for rubber parts such as automobile weather-strips, printer blades, rubber vibration-isolators, construction material gaskets for which EPDM rubber and various types of rubbers are used.

BRIEF DESCRIPTION OF THE DRAWING

FIG. 1 is a perspective view showing a rubbing part used for an abrasion resistance test in the embodiments of the present invention.

BEST MODE FOR CARRYING OUT THE INVENTION

The preferred embodiments of the present invention will be described. It is to be understood that the present invention is not limited to the embodiments described below.

The embodiment of the coating agent composition according to the present invention includes an emulsion containing (A) polydiorganosiloxane having a viscosity of 50 to 10,000,000 mPa·s (at 25° C.) and having both terminal ends blocked by hydroxyl groups, (B) polyorganohydrogensiloxane having at least three hydrogen atoms bonded to silicon atoms in one molecule, (C) a curing catalyst and (D) chlorinated polyolefine and/or acryl-modified polyolefine. And, (E) fine spherical particles comprises of a rubber-like elastomer having hardness of less than 90 are mixed to disperse into the emulsion.

This embodiment will be described in detail below.

The polydiorganosiloxane having the terminal ends blocked by the hydroxyl group of the component (A) has the hydroxyl group bonded to silicon atom at the terminal ends of the molecule and is concerned in a curing reaction by its reactivity.

Specific examples of an organic group bonded to the silicon atoms in the polydiorganosiloxane are an alkyl group such as a methyl group, an ethyl group, a propyl group, a butyl group or a hexyl group; an alkenyl group such as a vinyl group or a propenyl group; an aryl group such as a phenyl group; an aralkyl group such as a phenethyl group; and one which has a part of hydrogen atoms of their hydrocarbon groups replaced with a halogen atom, a nitril group and so on. And, the methyl group is desirable taking the ease of synthesis and the physical properties of the cured coating film into consideration.

Such a terminal hydroxyl group-blocked polydiorganosiloxane has a viscosity of 50 to 10,000,000 mPa·s at 25° C., and preferably 1,000 to 2,000,000 mPa·s. If the viscosity is less than 50 mPa·s, the cured coating film becomes brittle, and if the viscosity exceeds 10,000,000 mPa·s, it is difficult to obtain a stable emulsion.

When the polydiorganosiloxane as the component (A) has a viscosity falling in the above-described range at 25° C., one element may be used alone or two elements or more may be used as a mixture. Besides, it is desirably linear polysiloxane but may have partly a branch structure or a network structure. And, if the polydiorganosiloxane of the component (A) has a viscosity of 100,000 mPa·s or more, it is desirable to produce by a known emulsion polymerization to obtain a stable emulsion.

The polyorganohydrogensiloxane of the component (B) has at least three hydrogen atoms which are bonded to the silicon atoms and undergoes a dehydrogenation condensation reaction with the terminal hydroxyl group-blocked polydiorganosiloxane of the component (A) to form a network structure.

In this polyorganohydrogensiloxane of (B), the organic group bonded to the silicon atoms in the molecule is the same one to the organic group bonded to the silicon atoms of the component (A). The siloxane chain of the polyorganohydrogensiloxane may be any of linear, branched and cyclic.

The blending amount of the component (B) is desirably 0.5 to 20 parts by weight to 100 parts by weight of the polydiorganosiloxane of the component (A). When the blending amount of the component (B) is less than 0.5 part by weight, the curing speed is too slow to form the coating film continuously, and when it exceeds 20 parts by weight, it is not desirable because the cured coating film becomes brittle.

The curing catalyst of the component (C) used in the present invention is a catalyst for promoting a dehydrogenation condensation reaction between the hydroxyl group of the terminal hydroxyl group-blocked polydiorganosiloxane of the component (A) and an Si—H bond of the polyorganohydrogensiloxane of the component (B). The curing catalysts may be metallic fatty acid salts, amines, quaternary ammonium hydroxides or the like. They can be used together.

Examples of the metallic fatty acid salts include dibutyltin diacetate, dibutyltin dioctoate, dibutyltin dilaurate, dibutyltin dioleate, dibutyltin distearate, tributyltin acetate, tributyltin octoate, tributyltin laurate, dioctyltin diacetate, dioctyltin dilaurate, diethyltin dioleate and monomethyltin dioleate which have hydrocarbon groups directly bonded to metallic atoms, and zinc octenate, iron octenate and tin octenate which do not have hydrocarbon groups directly bonded to metallic atoms.

Examples of the amines include organic amines such as monomethylamine, dimethylamine, monoethylamine, diethylamine, ethylenediamine and hexamethylenetetramine; silane compounds having an amino group such as α-aminopropyltriethoxysilane and their salts. Examples of the quaternary ammonium hydroxides include tetramethylammonium hydroxide, dimethylbenzyl ammonium hydroxide and their salts.

A blending amount of the curing catalyst of (C) is preferably in a range of 0.1 to 10 parts by weight to 100 parts by weight of the polydiorganosiloxane of (A) above when the blending amount of the curing catalyst of (C) is less than 0.1 part by weight, the curing speed is too slow to form the continuous coating film, and when it exceeds 10 parts by weight, it is not desirable because the composition stability is degraded.

To produce the emulsion containing the above-described components (A), (B) and (C), the individual components may be solely formed into emulsions by using an appropriate emulsifying agent and then mixed, or two or three of the components may be mixed and formed into an emulsion. An emulsion produced by an existing mechanical emulsification or emulsion polymerization can be used appropriately.

The component (D) is one of the characteristic components of the present invention and provides the coating film obtained from the coating agent composition of the present invention with adhesiveness and abrasion resistance which are good for a rubber substrate and the like. And, it provides stability to the emulsion after mixing the individual components, making it possible to provide a long usable life.

The component (D) contains at least one of the chlorinated polyolefine and the acryl-modified polyolefine. And, it is preferable that the chlorinated polyolefine and the acryl-modified polyolefine are blended in a state of emulsion.

In the chlorinated polyolefine emulsion, a chlorine content or a base polyolefine molecular weight is not particularly limited, but it is desirable to use modified chlorinated polypropylene having a maleic anhydride group as a reaction group, namely an emulsion of maleic anhydride-modified chlorinated polypropylene because of the easiness of availability. It is particularly desirable to use an emulsion of the maleic anhydride-modified chlorinated polyolefine having a molecular weight of 10,000 to 200,000, a chlorine content of 5 to 35 wt % and a maleic anhydride group content of 0.1 to 30 wt %.

In the acryl-modified polyolefine emulsion, an acrylic modification rate (content) and a base polyolefine molecular weight are not particularly restricted, but it is desirable to use acryl-modified polyolefine having a maleic anhydride group, as a reaction group, namely an emulsion of maleic anhydride•acryl-modified polyolefine because of the easiness of availability. Especially, it is desirable to use the emulsion of the maleic anhydride•acryl-modified polyolefine having a molecular weight of 10,000 to 200,000, an acryl group content of 5 to 35 wt % and a maleic anhydride group content of 0.1 to 30 wt %.

The component (D) content as a total of the chlorinated polyolefine and the acryl-modified polyolefine is determined to be 5 to 150 parts by weight, and more preferably 50 to 100 parts by weight, to 100 parts by weight of the polydiorganosiloxane (A). The total content of the components (D) is limited to the above-described range because, when it is less than 5 parts by weight, the purpose of blending to improve the adhesiveness with the rubber substrate and the abrasion resistance cannot be achieved satisfactorily. Meanwhile, when the content exceeds 150 parts by weight, the effect of improvement of the adhesiveness with the rubber substrate and the abrasion resistance is saturated, and weatherability and other properties are degraded.

The fine spherical particles comprised of the rubber-like elastomer of the component (E) are also one of the characteristic components. The fine spherical particles of the rubber-like elastomer lower a coefficient of friction of the coating film obtained from the coating agent composition of the present invention, provide good lubricating properties, and also provide outstanding abrasion resistance. And, the production of creaking sound can be prevented when a coated mold part is rubbed against the surface of wet glass. Besides, a demand for no damage to a coated metal surface by friction can be satisfied.

The rubber-like elastomer forming the fine spherical particles is not limited to a particular type, but an elastic material having a value of hardness (rubber hardness) of less than 90, more preferably in a range of 60 to 80, measured according to JIS K 6253 is used. When fine particles of a hard or semihard material having hardness of 90 or more are used, the effects for prevention of creaking sound in the above-described water leaked state and prevention of damage to a coated metal surface cannot be obtained satisfactorily.

As the fine spherical particles of the rubber-like elastomer of the component (E), cross-linked urethane-based, cross-linked polymethyl methacrylate-based, cross-linked polyacrylic ester-based, cross-linked polybutyl methacrylate-based and silicone-based polymers are desirably used in view of the ease of availability and synthesis. And, such fine spherical particles have desirably an average particle diameter of 0.1 to 100 μm, and more preferably 1 to 20 μm. When the average particle diameter is less than 0.1 μm, the coating film has inferior lubricating properties, and when the average particle diameter exceeds 100 μm, the abrasion resistance becomes poor.

The blending amount of the fine spherical particles of the rubber-like elastomer (E) is 10 to 150 parts by weight, and more preferably 30 to 75 parts by weight, to 100 parts by weight of the polydiorganosiloxane (A). The blending amount of the component (E) was limited to the above range because the coating film has poor lubricating properties when the blending amount is less than 10 parts by weight, and because the coating property is degraded, the particles are aggregated and the coating film has a rough feeling when it exceeds 150 parts by weight.

To improve wettability in the surface of the substrate of rubber or the like and to prevent a deviation to one side or repellency at the time of coating, alkylamine oxide can be added in a range of 0.5 to 10 wt % at a solid content ratio to the emulsion. The alkylamine oxide can be dimethyl alkylamine oxide. Examples of the alkyl group include a lauryl group, a myristyl group, a natural oil and fat denatured group of coconut oil or the like.

For further improvement of the adhesiveness, an emulsion containing water-insoluble amino group-containing polyorganosiloxane can be added to the coating agent composition of the embodiment. The adding amount of the water-insoluble amino group-containing polyorganosiloxane is determined to be 3 to 50 wt % of the solid content of the emulsion composition in view of the coating efficiency and coating property, and it is desired to adjust the water-insoluble amino group-containing polyorganosiloxane with water so to have a component concentration falling in the above range.

The water-insoluble amino group-containing polysiloxane is polyorganosiloxane represented by the general formula: $[R_a^1Si(OR^2)_bO_{(4-a-b)/2}]_n$ (where, $R^1$ indicates at least two selected from a hydrogen atom and a monovalent substituted or unsubstituted hydrocarbon group, at least two among all $R^1$ in one molecule are monovalent hydrocarbon groups substituted by substituted or unsubstituted amino groups bonded to a silicon atom via at least one carbon atom; $R^2$ indicates at least one selected from a hydrogen atom and a monovalent substituted or unsubstituted hydrocarbon group; a and b indicate numerals satisfying the relationships $1 \leq a \leq 2.5$, $1 \leq a+b \leq 2.5$, $0 \leq b \leq 0.5$, and n indicates numeral 4 to 5,000).

In this amino group-containing polysiloxane, examples of the substituted or unsubstituted amino groups bonded to the silicon atom via at least one carbon atom include an aminomethyl group, β-aminoethyl group, γ-aminopropyl group, δ-aminobutyl group, γ-(methylamino)propyl group, γ-(ethylamino)propyl group, N-(β-aminoethyl)-γ-aminopropyl group and N-(β-dimethylaminoethyl)-γ-aminopropyl group. Examples of $R^1$ other than these amino group-containing hydrocarbon groups include a hydrogen atom, alkyl groups such as methyl group, ethyl group, propyl group, butyl group and hexyl group; alkenyl groups such as a vinyl group and propenyl group; aryl groups such as a phenyl group; aralkyl groups such as a phenethyl group; and those having hydrogen atoms of these hydrocarbon groups partly substituted by halogen atoms or nitril groups. The hydrogen atom, methyl group, vinyl group and phenyl group are desirable, and the methyl group is particularly desirable because of the ease of synthesis and handling.

Examples of $R^2$ include a hydrogen atom, methyl group, ethyl group, propyl group and butyl group and so on. In them, the hydrogen atom, methyl group and ethyl group are desirable because of the ease of synthesis and handling.

In the general formula (average compositional formula) representing the water-insoluble amino group containing polysiloxane, a and b are numerals satisfying the above-described relationships, and when a and (a+b) are less than 1 or exceed 2.5, adhesiveness to the substrate is not improved. And, b indicates the number of the hydroxyl group or alkoxy group bonded to the silicon atoms and is desired to be 0.5 or less. When it exceeds 0.5, the storage stability of the coating agent is degraded.

Besides, the water-insoluble amino group-containing polysiloxane has a polymerization degree n falling in a range of 4 to 5,000, and preferably 4 to 1,000, from the viewpoint of the ease of synthesis, the viscosity of the composition before curing falling in a range not hindering the work and the adhesiveness of the cured coating film. When the polymerization degree n is smaller than 4, the adhesiveness is not improved satisfactorily, and when the polymerization degree n is bigger than 5,000, it is difficult to synthesize the polysiloxane and the viscosity increases, making it difficult to handle.

The amount of the amino group in this water-insoluble amino group-containing polysiloxane is desirably an amount solely capable of providing a water insoluble state, and an amount of 100 to 15,000 (g/mol), preferably 150 to 1,000 (g/mol), in amino equivalent is usable. The water-insoluble amino group-containing polysiloxane having the amino equivalent exceeding 15,000 (g/mol) or less than 100 (g/mol), cannot improve the adhesiveness.

The coating agent composition of the embodiment of the present invention is coated onto the surface of the substrate made of paper, rubber, plastic or metal by a method such as dip coating, spray coating, brush coating, knife coating or roll coating. Then, the coated substrate is left standing at room temperature for several hours or heated appropriately depending on the heat resistance of the substrate to cure the coated film. The heating conditions are preferably set to a temperature of 120 to 180° C. for 10 to 30 seconds for the paper substrate, a temperature of 80 to 180° C. for 1 to 5 minutes for the rubber substrate, and a temperature of 70 to 150° C. for 30 seconds to 2 minutes for the plastic substrate.

In order to improve the adhesiveness of the coating film with the substrate, various types of silane coupling agents may be added alone or as a mixture with or without partial condensation to the coating agent composition of the embodiment.

Besides, according to the embodiment, an inorganic or organic ultraviolet absorber for improvement of weatherability, polydimethylsiloxane having a high viscosity for further improvement of lubricating properties, an organic or inorganic filler having an average particle diameter of 0.01 to 100 μm formed of polyalkyl silsesquioxane, polyolefine such as polyethylene, polycarbonate resin or the like for improvement of a matte texture and lubricating properties, and an inorganic pigment for coloring can be added in a range not failing to achieve the object of the present invention. If necessary, a thickener, an antifoaming agent and a preservative can be mixed appropriately.

When the coating agent composition of the embodiment of the invention is used to treat the surface of each type of substrate, a cured coating film excelling in uniform applying property and the adhesiveness and abrasion resistance to the substrate in comparison with a treatment by a conventional silicone composition can be obtained. And, a coating film having outstanding adhesiveness and abrasion resistance can be formed on a rubber or plastic substrate, particularly a substrate formed of foamed or non foamed EPDM rubber, on which a coating film having sufficient adhesiveness could not be formed by using the conventional silicone composition for forming a non adhesive coating film.

And, according to the coating agent composition, the cured coating film is formed at room temperature or a relatively low temperature. Therefore, the cured coating film, which can be formed on a substrate having a low heat resistance and a substrate which is large and hardly heat-treated, and has good non tackness to other substances, water repellency and outstanding abrasion resistance, is formed. Besides, the emulsion of each component has outstanding storage stability, stability after mixing the emulsions of individual components is outstanding, and a usable life is long.

Accordingly, the coating agent composition of the present invention can be used suitably as a surface treatment agent for rubber parts such as automobile weather-strips, printer blades, rubber vibration-isolators, building material gaskets formed of EPDM rubber and so on. Besides, the coating agent composition of the present invention is used to provide various types of substrates of rubber, plastic and the like with non tackness and water repellency.

EXAMPLES

Examples of the present invention will be described specifically, but it is to be understood that the invention is not limited to the examples. In the examples, all physical properties such as a viscosity indicated are values determined at 25° C. and a relative humidity of 50%, and the parts in Table 1 indicate parts by weight.

Examples 1 to 5, Comparative Examples 1 to 6

Individual components shown in Table 1 were mixed in the proportions indicated vertically in the table to prepare coating agent compositions.

In Table 1, the polydimethylsiloxane emulsion is an emulsion-polymerized emulsion containing terminal hydroxyl group-blocked polydimethylsiloxane having a viscosity of 1,400,000 mPa·s at a ratio of 50 wt %, and the methylhydrogen siloxane emulsion is a mechanical emulsified emulsion containing polymethylhydrogen siloxane represented by the average formula: $(CH_3)_3SiO(CH_3HSiO)_{50}Si(CH_3)_3$ at a ratio of 30 wt %.

Chlorinated polyolefine emulsion-1 is an emulsion containing maleic anhydride-modified chlorinated polypropylene having a molecular weight of about 60,000, a maleic anhydride content of 1.6 wt %, a chlorine content of 17 wt %, at a ratio of 30 wt % and chlorinated polyolefine emulsion-2 is an emulsion containing maleic anhydride-modified chlorinated polypropylene having a molecular weight of about 100,000, a maleic anhydride content of 1.5 wt %, a chlorine content of 15 wt %, at a ratio of 30 wt %.

The acryl-modified polyolefine emulsion is an emulsion containing maleic anhydride·acryl-modified polyolefine having a molecular weight of about 68,000, a maleic anhydride content of 1.6 wt %, an acryl content of 3 wt % (an ethylene-propylene copolymer of propylene 97.5 mol % and ethylene 2.5 mol %) at a ratio of 30 wt %.

The water-insoluble amino group-containing polysiloxane is an emulsion-polymerized emulsion containing amino group-containing polysiloxane which is represented by the average formula: $\{H_2N(CH_2)_2NH(CH_2)_3\}SiO[\{(CH_3)_2SiO\}_{15}OH]_3$ at a ratio of 30 wt %, and water-soluble amino silicone is represented by the average formula: $(CH_3)_3SiO[\{H_2N(CH_2)_2NH(CH_2)_3\}CH_3SiO]_{100}(CH_3)_3$.

Elastic fine spherical particles-1 is powder (an average particle diameter of 5 μm) of a dimethyl silicone cross-linked elastomer having hardness (hereinafter simply referred to as JIS hardness) of 75 measured by a durometer type A according to JIS K6253, elastic fine spherical particles-2 is cross-linked urethane soft powder (an average particle diameter of 6 μm) having JIS hardness of 74, and elastic fine spherical particles-3 is cross-linked polyacrylic ester powder (an average particle diameter of 15 μm) having JIS hardness of 78.

Non elastic fine spherical particles are powder of hard resin having the JIS hardness of 90 or more, non elastic fine spherical particles-1 is polymethyl silsesquioxane powder (an average particle diameter of 6 μm), non elastic fine spherical particles-2 is cross-linked urethane hard powder (an average particle diameter of 10 μm), and non elastic fine spherical particles-3 is nylon powder (an average particle diameter of 5 μm).

Then, the prepared coating agent composition was coated on the surface of an foamed EPDM rubber sheet by a spray gun. Then, water was volatilized from the coated film, which was then heated to dry by an oven at 150° C. for 10 minutes to obtain a cured coating film having a thickness of 10 μm.

The foamed EPDM rubber sheet having the surface treated as described above was examined for adhesiveness, solvent resistance, a coefficient of friction, abrasion resistance and creaking sound of the cured coating film. And, the usable lives of the coating agent compositions were examined. The results are shown in Table 1.

The adhesiveness, solvent resistance, coefficient of friction, abrasion resistance, creaking sound and usable lives of the coating films were examined by the following methods.

[Adhesiveness]

Eleven parallel lines were marked in a matrix at intervals of 1 mm on the surface of the coating film to cross-cut 100 grids, an adhesive tape was adhered to them and peeled afterward, and the grids not peeled were counted. The adhesive tape was prepared by coating a silicone pressure-sensitive adhesive YR3340 (produced by GE Toshiba Silicones) in thickness of 40 μm on a polyester tape and leaving the tape standing in a constant temperature and humidity chamber for 48 hours.

[Solvent Resistance]

The surface of the coating film was rubbed reciprocally 30 times with wiping paper impregnated with hexane, and the rubbed surface of the coating film was examined.

[Coefficient of Friction]

A glass plate of 10 mm wide and 100 mm long was placed on the surface of the coating film, and a load of 200 g was applied to move the glass plate at a speed of 900 mm/min. And, a dynamic friction coefficient was determined from the obtained tensile stress. A maximum static friction coefficient is a value at the time when the glass plate is started to move.

[Abrasion Resistance]

The glass piece shown in FIG. 1 with a contact surface formed to have a curved surface of 2 mm in thickness and 20 mm in width was used as a rubbing part. The rubbing part was pressed against the surface of the coating film under a load of 400 g and moved to reciprocate for a distance of 15 cm at a speed of 60 times/min. to conduct the abrasion test. The abrasion resistance was evaluated according to the number of reciprocated times when the surface of the foamed EPDM rubber sheet was worn out by abrasion.

[Creaking Sound]

Water of 0.5 mL was uniformly spread on a glass plate of 100 mm in width and 100 mm in length, and sound produced when the surface of the coating film was rubbed against the glass plate was examined. It was judged good when no sound was produced.

[Usable Life]

The coating agent compositions were prepared, and a time until a gel was produced in each solution at room temperature (25° C.) was examined.

TABLE 1

|  |  | Examples | | | | | Comparative Examples | | | | | |
|---|---|---|---|---|---|---|---|---|---|---|---|---|
|  |  | 1 | 2 | 3 | 4 | 5 | 1 | 2 | 3 | 4 | 5 | 6 |
| COMPOSITION PARTS | Polydimethylsiloxane Emulsion | 20 | 20 | 20 | 20 | 20 | 20 | 20 | 20 | 20 | 20 | 20 |
|  | Methylhydrogen siloxane Emulsion | 2 | 2 | 2 | 2 | 2 | 2 | 2 | 2 | 2 | 2 | 2 |
|  | Chlorinated polyolefine emulsion-1 | 20 |  | 20 | 20 |  |  |  | 20 | 20 | 20 |  |
|  | Chlorinated polyolefine emulsion-2 |  | 20 |  |  |  |  |  |  |  |  |  |
|  | Acryl-modified polyolefine Emulsion |  |  |  |  | 20 |  |  |  |  |  | 20 |
|  | Dibutyltin dilaurate | 1 | 1 | 1 | 1 | 1 | 1 | 1 | 1 | 1 | 1 | 1 |
|  | Aqueous solution of 30% dimethyl laurylamineoxide | 2 | 2 | 2 | 2 | 2 | 2 | 2 | 2 | 2 | 2 | 2 |
|  | Water-insoluble amino group-containing polysiloxane | 10 | 10 | 10 | 10 | 10 | 10 | 10 | 10 | 10 | 10 | 10 |
|  | Elastic fine spherical particles-1 | 5 | 5 |  |  | 5 |  |  |  |  |  |  |
|  | Elastic fine spherical particles-2 |  |  | 5 |  |  | 5 |  |  |  |  |  |
|  | Elastic fine spherical particles-3 |  |  |  | 5 |  |  |  |  |  |  |  |
|  | Water-soluble amino Silicone |  |  |  |  |  |  | 1.5 | 1.5 |  |  |  |
|  | γ-Aminopropyltriethoxysilane |  |  |  |  |  |  | 1.5 | 1.5 |  |  |  |
|  | Acetic acid |  |  |  |  |  |  | 1.5 | 1.5 |  |  |  |
|  | Glycidoxypropyltri- |  |  |  |  |  |  | 1.5 | 1.5 |  |  |  |

TABLE 1-continued

| | | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| | methoxysilane | | | | | | | | | | | |
| | Non elastic fine spherical particles-1 | | | | | | | 5 | 5 | | | 5 |
| | Non elastic fine spherical particles-2 | | | | | | | | | 5 | | |
| | Non elastic fine spherical Particles-3 | | | | | | | | | | 5 | |
| | Water | 40 | 40 | 40 | 40 | 40 | 54 | 54 | 40 | 40 | 40 | 40 |
| *1 | Adhesiveness | 100/100 | 100/100 | 100/100 | 100/100 | 100/100 | 100/100 | 100/100 | 100/100 | 100/100 | 100/100 | 100/100 |
| | Solvent resistance | Good | Good | Good | Good | Good | Good | Good | Good | Good | Good | Good |
| | Coefficient of friction | 0.30 | 0.31 | 0.25 | 0.18 | 0.33 | 0.27 | 0.15 | 0.15 | 0.08 | 0.10 | 0.19 |
| | Abrasion resistance (Rubbing times) | 15000 | 14000 | 6000 | 7000 | 10000 | 3000 | 2000 | 3000 | 7000 | 3000 | 3000 |
| | Creaking sound | Good | Good | Good | Good | Good | Good | *2 | *2 | *2 | *2 | *2 |
| | Usable life (Hours) | 72 h or more | 72 h or more | 72 h or more | 72 h or more | 72 h or more | 8 h | 8 h | 72 h or more | 72 h or more | 72 h or more | 72 h or more |

*1: physical properties
*2: Production of Creak

As described above, according to the coating agent composition of the present invention, the cured coating film having quite excellent adhesiveness, good lubricating properties, non tackness and water repellency to the substrate formed of rubber or plastic, and particularly the substrate made of the foamed or non foamed EPDM rubber, can be formed. This coating film has a low coefficient of friction and good abrasion resistance.

Therefore, the coating agent composition of the present invention is suitably used as a surface treatment agent for rubber parts such as automobile weather-strips, printer blades, rubber vibration-isolators and building material gaskets.

What is claimed is:

1. A coating agent composition, comprising:
    a water-based emulsion and fine spherical particles, the water-based emulsion comprising:
    A) polydiorganosiloxane having a viscosity of 50 to 10,000,000 mPa·s at 25° C. and having both terminal ends blocked by hydroxyl groups,
    B) polyorganohydrogensiloxane having at least three hydrogen atoms bonded to silicon atoms in one molecule,
    C) a curing catalyst, and
    D) chlorinated polyolefine and/or acryl-modified polyolefine,
    wherein the fine spherical particles comprise an elastomer selected from the group consisting of a cross-linked urethane-based polymer, a cross-linked methyl methacrylate-based polymer, a cross-linked acrylic ester-based polymer, and a cross-linked butyl methacrylate-based polymer, the elastomer having hardness of 60 to 80, and are mixed to disperse into the water-based emulsion.

2. The coating agent composition according to claim 1, wherein the total content of the chlorinated polyolefine and the acryl-modified polyolefine of the Components (D) is 5 to 150 parts by weight to 100 parts by weight of the polydiorganosiloxane of the component (A).

3. The coating agent composition according to claim 1, wherein the content of the fine spherical particles of the elastomer is 10 to 150 parts by weight to 100 parts by weight of the polydiorganosiloxane (A).

4. The coating agent composition according to claim 1, further comprising alkylamine oxide and/or water-insoluble amino group-containing polyorganosiloxane.

5. A molded part formed of a foamed or non-foamed ethylene-propylene-diene ternary copolymer that is coated with the coating agent composition of claim 1.

* * * * *